(12) United States Patent
Wang et al.

(10) Patent No.: US 7,886,318 B2
(45) Date of Patent: Feb. 8, 2011

(54) SET TOP BOX WITH DIGITAL RIGHTS MANAGEMENT FOR MULTIPLE DEVICES AND METHODS FOR USE THEREWITH

(75) Inventors: Feng Chi Wang, Austin, TX (US); Philip Poulidis, Oakville (CA)

(73) Assignee: Morega Systems Inc., Mississauga, Ontario (CA)

( * ) Notice: Subject to any disclaimer, the term of this patent is extended or adjusted under 35 U.S.C. 154(b) by 603 days.

(21) Appl. No.: 11/821,557

(22) Filed: Jun. 22, 2007

(65) Prior Publication Data

US 2008/0320543 A1    Dec. 25, 2008

(51) Int. Cl.
*H04N 7/16* (2011.01)
*H04N 7/167* (2011.01)
*B41K 3/38* (2006.01)
*H04L 29/06* (2006.01)
*G06F 21/00* (2006.01)
*G06F 15/173* (2006.01)

(52) U.S. Cl. .............. 725/25; 725/30; 725/31; 726/7; 726/18; 726/19; 380/59; 380/231; 380/233; 380/234; 713/165; 713/167; 709/223

(58) Field of Classification Search .......... 725/25, 725/30, 31; 726/7, 18–19; 380/231, 233, 380/234, 59; 713/165, 167; 705/50–52; 709/223

See application file for complete search history.

(56) References Cited

U.S. PATENT DOCUMENTS

| | | | | |
|---|---|---|---|---|
| 5,825,751 A * | 10/1998 | Papierniak et al. | ........... | 370/248 |
| 6,654,805 B1 * | 11/2003 | Aldred et al. | ............... | 709/224 |
| 6,993,508 B1 * | 1/2006 | Major et al. | .................. | 705/51 |
| 7,426,639 B2 * | 9/2008 | Ishiguro | ...................... | 713/175 |
| 7,549,172 B2 * | 6/2009 | Tokutani et al. | ............... | 726/27 |
| 7,555,464 B2 * | 6/2009 | Candelore | ..................... | 705/59 |
| 2002/0091642 A1 * | 7/2002 | Rahnasto | ..................... | 705/52 |
| 2002/0147975 A1 * | 10/2002 | Seo | ............................ | 725/39 |
| 2002/0161680 A1 * | 10/2002 | Tarnoff | ......................... | 705/35 |
| 2004/0031058 A1 * | 2/2004 | Reisman | ..................... | 725/112 |
| 2005/0004873 A1 * | 1/2005 | Pou et al. | ...................... | 705/51 |
| 2005/0228858 A1 * | 10/2005 | Mizutani et al. | ............ | 709/201 |
| 2005/0246282 A1 * | 11/2005 | Naslund et al. | ............... | 705/52 |
| 2005/0246757 A1 * | 11/2005 | Relan et al. | .................. | 725/135 |
| 2007/0094366 A1 * | 4/2007 | Ayoub | ........................ | 709/223 |
| 2007/0239608 A1 * | 10/2007 | Elbring | ........................ | 705/51 |
| 2008/0098212 A1 * | 4/2008 | Helms et al. | ................. | 713/155 |
| 2008/0201311 A1 * | 8/2008 | Ertugrul et al. | ................ | 707/4 |
| 2009/0177770 A1 * | 7/2009 | Jeong et al. | .................. | 709/224 |

* cited by examiner

*Primary Examiner*—Hoang-Vu A Nguyen-Ba
(74) *Attorney, Agent, or Firm*—Garlick Harrison & Markison; Bruce E. Stuckman

(57) ABSTRACT

Media content is received for a plurality of devices based on a user selection. The media content includes digital rights for the plurality of devices. The media content is transferred to at least one of the plurality of devices in accordance with the digital rights.

46 Claims, 12 Drawing Sheets

FIG. 5

Video Device Setup Menu

Device:

1. Color Monitor
2. iPod
3. ___

Pre-authorize additional download costs ?

| | yes | no |
|---|---|---|
| | [X] | [ ] |
| | [ ] | [X] |
| | [ ] | [X] |

Device Type:

1. PSP – Sony Playstation
2. Palm Treo
3. iPod
• • •

230

Download Selections

| Cost | |
|------|---|
| $9.99 | Discovery Channel: MODERN MARVELS – The development of the Matrix II 802.11x Baseband Processor |
| $4.99 | Citizen Kane |
| $5.99 | Casablanca |
| $59.99 | French language instruction |
| $0.99 | Bach Toccata & Fugue in D Minor |
| $4.99 | Beethoven's greatest hits CD |

Citizen Kane Selected

Would you like to be able to download Citizen Kane to additional devices?

| Yes | no |

| Cost | Device Selections | yes |
|---|---|---|
| $1.99 | One addt'l device | ☒ |
| $2.99 | Two addt'l devices | ☐ |
| $3.49 | Three addt'l devices | ☐ |

| Cost | Device Selections | yes | no |
|---|---|---|---|
| $1.19 | iPod | ☒ | ☐ |
| $0.99 | PSP Sony Playstation | ☐ | ☒ |

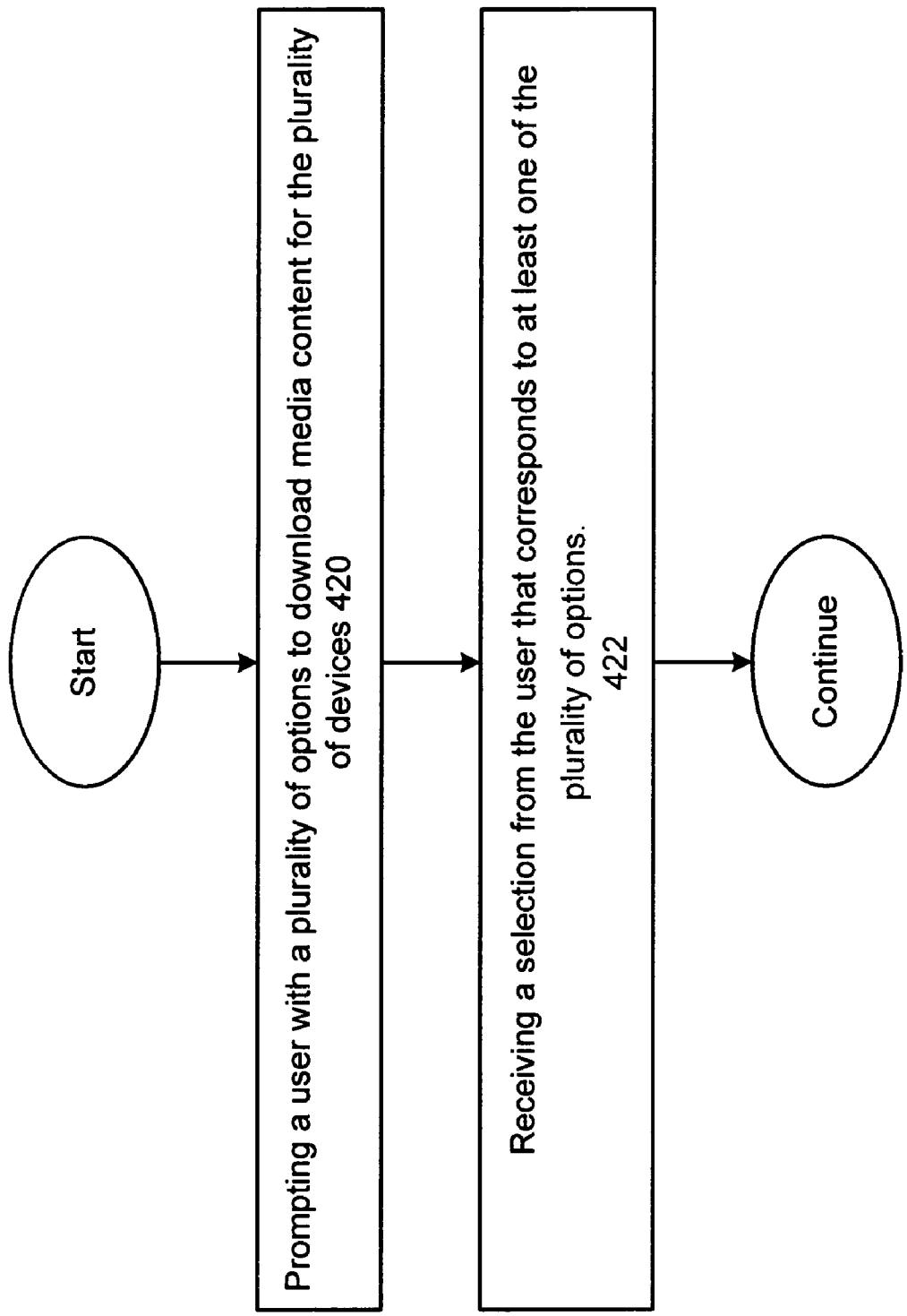

SET TOP BOX WITH DIGITAL RIGHTS MANAGEMENT FOR MULTIPLE DEVICES AND METHODS FOR USE THEREWITH

TECHNICAL FIELD OF THE INVENTION

The present invention relates to transfer of media content and related methods used in devices such as set-top boxes and other home media gateways.

DESCRIPTION OF RELATED ART

The number of households having multiple television sets is increasing, and many users want the latest and greatest video viewing services. As such, many households have multiple satellite receivers, cable set-top boxes, modems, et cetera. For in-home Internet access, each computer or Internet device can have its own Internet connection. As such, each computer or Internet device includes a modem.

As an alternative, an in-home wireless local area network may be used to provide Internet access and to communicate multimedia information to multiple devices within the home. In such an in-home local area network, each computer or Internet device includes a network card to access an IP gateway. The gateway provides the coupling to the Internet. The in-home wireless local area network can also be used to facilitate an in-home computer network that couples a plurality of computers with one or more printers, facsimile machines, as well as to multimedia content from a digital video recorder, set-top box, broadband video system, etc.

Certain media content, such as movies, songs, and music albums can be protected by digital rights management techniques that are meant to restrict unlicensed copying of copyrighted materials. For instance, music compact disks (CDs), video cassettes and digital video disks (DVDs) are recorded with copy protection signals that are meant to prevent the media content contained on these media from being copied.

BRIEF DESCRIPTION OF THE SEVERAL VIEWS OF THE DRAWINGS

FIG. 5 presents a pictorial representation of a screen display 230 in accordance with an embodiment of the present invention.

FIG. 6 presents a pictorial representation of a screen display 240 in accordance with an embodiment of the present invention.

FIG. 7 presents a pictorial representation of a screen display 250 in accordance with an embodiment of the present invention.

FIG. 8 presents a pictorial representation of a screen display 260 in accordance with an embodiment of the present invention.

FIG. 9 presents a pictorial representation of a screen display 270 in accordance with an embodiment of the present invention.

FIG. 12 presents a flowchart representation of a method in accordance with an embodiment of the present invention.

DETAILED DESCRIPTION OF THE INVENTION INCLUDING THE PRESENTLY PREFERRED EMBODIMENTS

Figure 1:
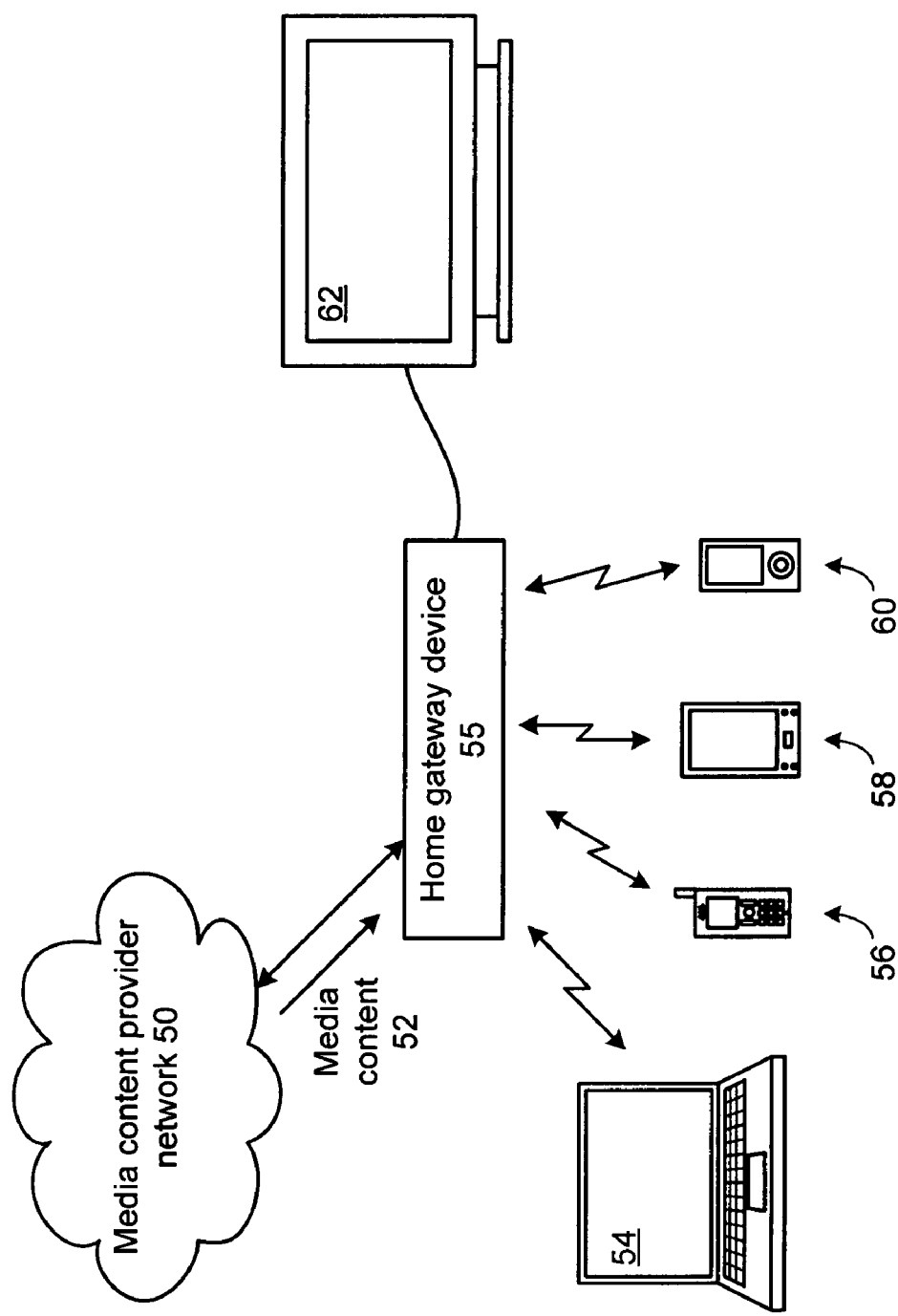
FIG. 1 presents a block diagram representation of a media distribution system that includes a home gateway device 55 in accordance with an embodiment of the present invention.

FIG. 1 presents a block diagram representation of a media distribution system that includes a home gateway device 55 in accordance with an embodiment of the present invention. In particular, home gateway device 55, can be a multimedia server, set-top box, personal computer, wireless local area network (WLAN) access point, television receiver that may be integrated into a television, cable television receiver, satellite broadcast receiver, broadband modem, 3G transceiver or other media gateway or transceiver that is capable of receiving a media content from media content provider network 50. The media content 52 can be in the form of one or more video signals, audio signals, software, ringtones, text, games, multimedia signals or other media signals that are either realtime signals in analog or digital format or data files that contain media content 52 in a digital format. For instance, media content 52 can be included in a broadcast video signal, such as a television signal, high definition televisions signal, enhanced high definition television signal or other broadcast video signal that has been transmitted over a wireless medium, either directly or through one or more satellites or other relay stations or through a cable network, optical network, IP television network, or other transmission network. Further, media content 52 can be included in a digital audio or video file, transferred from a storage medium such as a server memory, magnetic tape, magnetic disk or optical disk, or can be included in a streaming audio or video signal that is transmitted over a public or private network such as a wireless or wired data network, local area network, wide area network, metropolitan area network or the Internet.

Home media gateway device 55 is coupled to optionally play audio and video portions of the media content 52 on display device 62. Display device 62 can include a television, monitor, computer, handheld device or other video display device that creates an optical image stream either directly or indirectly, such as by optical transmission or projection, and/or that produces an audio output from media content 52. In addition, home gateway device 55 is coupleable to additional external devices such as portable computer 54, wireless telephony device 56, personal digital assistant 58 and personal audio/video player 60 to download or stream media content 52 to these devices in accordance with the present invention.

In an embodiment of the present invention, home gateway device 55 includes a wired link for coupling to external device 54, 56, 58, 60, etc. to transfer one or more digital audio or video files for playback of the media content 52. The coupling can include a serial or parallel connection such as a, Ethernet connection, Universal Serial Bus (USB) connection, an Institute of Electrical and Electronics Engineers (IEEE) 1394 (Firewire) connection, small computer serial interface (SCSI) connection or other wired connection that operates in accordance with either a standard or custom interface protocol. In this fashion, external devices such as desktop or portable computer 54, wireless telephony device 56, personal digital assistant 58, personal audio/video player 60 or other external devices can be coupled to the home gateway device 55 to receive compressed digital audio and/or video files from the home gateway device 55 through a synchronization or "sync" operation, or by command from one or the other of the two devices.

In another embodiment of the present invention, the home gateway device 55 includes a wireless link for coupling to one or more of the external devices 54, 56, 58, 60, etc. that operates in accordance with a wireless network protocol such as 802.11a,b,g,n (referred to generically as 802.11x), a BLUETOOTH wireless protocol, an Ultra Wideband (UWB) wireless protocol or other wireless connection that operates in accordance with either a standard or custom interface protocol in order to transfer media content 52 to one or more of these external devices.

In a further embodiment, the home gateway device 55 includes a removable memory, such as a removable drive, disk or memory card. In this fashion, the removable memory can be written with a compressed digital audio or video file that contains the media content 52 when inserted in the home gateway device 55 and read when inserted in one or more external devices for playback of the associated content.

In addition, one or more of the external devices 54, 56, 58, 60, etc, can be coupled to the home gateway device through a local area network connection or through one or more other networks including wired or wireless data networks, and/or the Internet. For example, portable computer 54 can obtain media content 52 from home gateway device 55 when traveling by connecting to the Internet, accessing the home gateway device 55 via the Internet and/or media content provider network 50 and either copying the media content 52 to the hard drive of portable computer 54 or by receiving a media content 52 as a streaming signal from the home gateway device 55. In a further example, wireless telephony device 56 can receive can obtain media content 52 from home gateway device 55 via the Internet, by accessing the home gateway device 55 remotely and either downloading the media content 52 to the memory of device or by receiving a media content 52 as a streaming signal from the home gateway device 55.

In operation, the home gateway device 55 receives media content 52 (optionally for itself for playing via display device 62) and one or more of the external devices 52, 54, 56, 58 and/or 60 selected by a user including digital rights corresponding to the associated playback devices that were selected. In this fashion, a user that receives a pay per view movie, downloads a music CD or song or that downloads a video can obtain sufficient digital rights from the media content provider network 50 to allow the media content 52 to be played by the display device 62 and by each of the external devices that have been selected. The home gateway device 55 can then transfer the media content 52 to each of the selected devices in accordance with the digital rights that have been obtained.

It should be noted that the digital rights for the home gateway device 55 and/or the associated external devices of the subscriber can be obtained as a group or requested individually, as addition external devices request transfer of the media content 52. These requests can come from or through the home gateway 55, or directly from an external device associated with the home gateway 55, provided that via registration, password or other authentication, media content provider network can validate a particular external device's association with home gateway device 55 and/or the subscriber for purposes of billing. To the extent that additional fees are charged for obtaining digital rights for these additional external devices, media content provider network 50 can keep track of the which digital rights have already been obtained for a particular instance of media content 52 and only charge incremental fees for obtaining the additional rights requested. For instance, if the home gateway device 55 has obtained the rights to store and playback a copy of the movie "Casablanca" for $7.99. If the same movie is requested by portable computer 54, either directly from the portable computer 54 to the media content provider network 50 through an internet connection or by or through the home media gateway 55, the cost of these incremental rights can be reduced and reflect a package discount for all the rights obtained for the home media gateway 55 and the external devices associated therewith.

It should also be noted that digital rights can be obtained provisionally for one or more of the external devices, with the subscriber being billed to obtain these rights only when they are used. For instance, the home gateway device 55 can obtain the rights to store and playback a copy of the movie "Casablanca" for $7.99 and the rights to transfer this movie each of the external devices associated with the home gateway 55. Provided however, each transfer of the movie to an external device incurs an additional billing, such as $0.99 to the account of the subscriber.

While the above description discusses additional billing for obtaining digital rights for additional devices, in alternative embodiments, these additional rights can be obtained at no additional cost, for instance, with the cost bundled into the cost of obtaining rights for one subscriber device or as part of a promotion. In addition, ad insertion can be used, for instance, as a basis for the media content provider to offset the potential costs of addition rights. For example, the media content provider may elect to not bill the user for transferring content to additional devices, but instead, based on a combination of the subscribers profile, multimedia context and target device information (such as geographical location, device model, etc.), may insert an ad into the media content or otherwise cause an ad to be inserted in the media content.

Further details regarding the present invention including alternative embodiments, optional implementations, functions and features are presented in conjunction with FIGS. 2-12 that follow.

Figure 2:
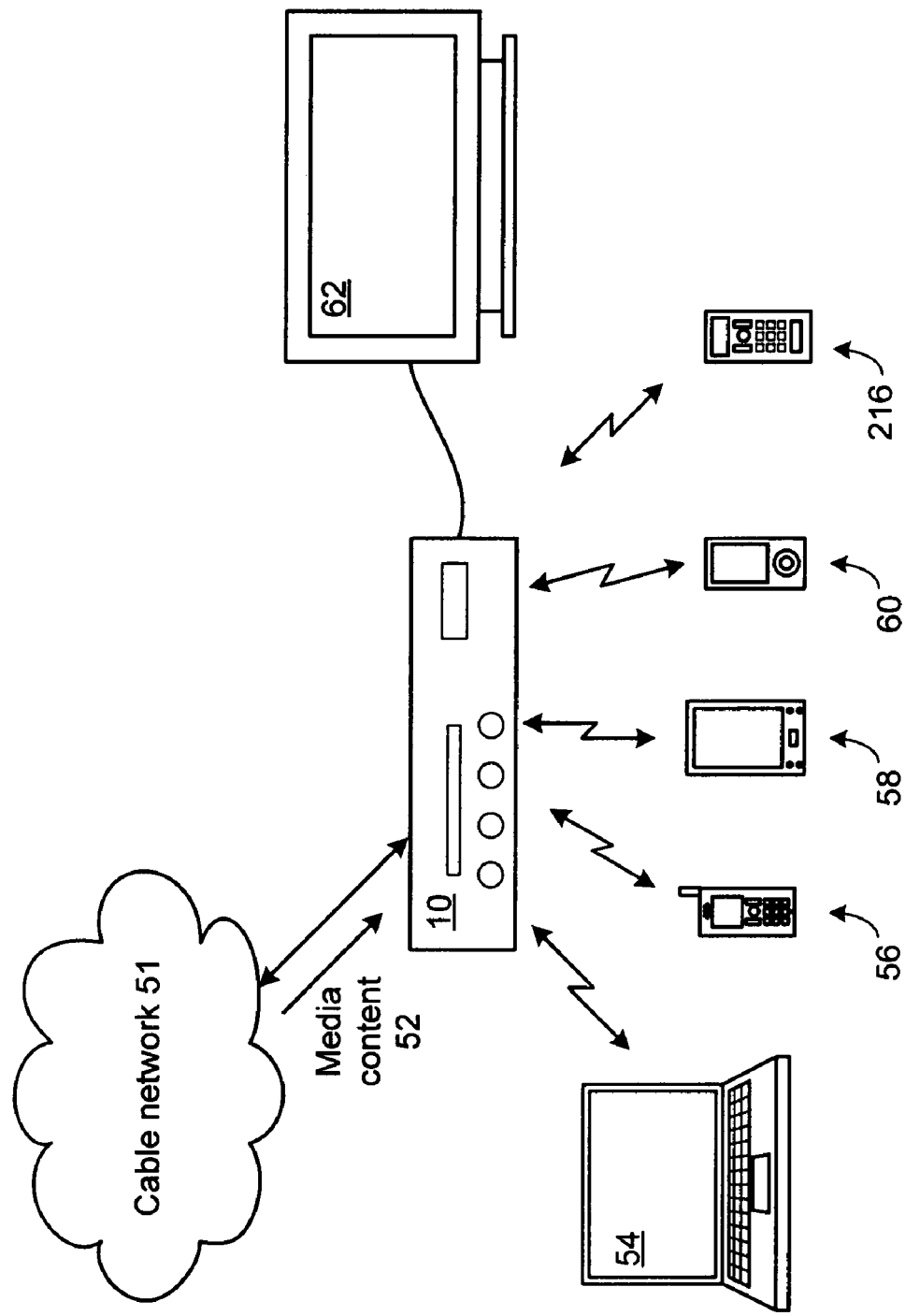
FIG. 2 presents a block diagram representation of a cable system that includes a set-top box 10 in accordance with an embodiment of the present invention.

FIG. 2 presents a block diagram representation of a cable system that includes a set-top box 10 in accordance with an embodiment of the present invention. In this embodiment, set-top box 10 receives media content 52 from the cable network 51 for playback by the display device 62 and one or more of the external device 54, 56, 58 and/or 60, as selected by a user. The media content 52 is obtained along with digital rights for the set-top box and the at least one external device, wherein the digital rights allow playback by the set top box and the at least one external device and prohibits playback by other devices.

The set top box 10 includes one or more of the functions and features associated with home gateway 55 including the various optional couplings to the external devices 54, 56, 58 and/or 60. Via one of these couplings, the set-top box 10 can then transfer the media content 52 to at least one external device in accordance with the digital rights.

Set-top box 10 can receive user commands and other user initiated signaling via remote control device 216 that communicates with the set top box via infrared or other wireless signaling. In an embodiment of the present invention, set-top box includes a graphical user interface that operates in conjunction with display device 62 and remote control device 216 to provide set-up, select media content 52, to receive other user commands and selections in conjunction with the standard set top box functionality and to provide the selections, commands and other data inputs that are specific to the one or more features of the present invention. Examples of such features are presented in conjunction with FIGS. 5-9 that follow.

In general, a video signal transferred from the cable network 51 to the set-top box 10 can include an analog video signal that is formatted in any of a number of video formats including National Television Systems Committee (NTSC), Phase Alternating Line (PAL) or Sequentiel Couleur Avec Memoire (SECAM). Further, such signals can be in a digital format such as a Motion Picture Experts Group (MPEG) format (such as MPEG1, MPEG2 or MPEG4), Quicktime format, Real Media format, Windows Media Video (WMV) or Audio Video Interleave (AVI), or another digital video format, either standard or proprietary. In an embodiment of the present invention, the connection between cable network 51 and set-top box 10 includes a Data Over Cable Service Interface Specification (DOCSIS) link that allows data, including media content 52 to be received by set-top box 10.

In an embodiment of the present application, a user of set-top box 10 can select particular media content 52 and the particular devices that the user wishes to view the media content so that digital rights can be obtained commensurate with the intended viewing. For example, if a user wishes to watch a pay-per-view special, the user may choose to obtain digital rights to play the special live on the display device 62, but also to obtain digital rights to transfer and/or store the special to another device such as personal audio/video player 60, to be watched at a different time. Further, a user that wishes to watch a video-on-demand showing of a feature film may wish to obtain sufficient digital rights to store the feature film on a removable memory such as a memory card or a digital video disc DVD for use with one or more external devices, and to otherwise store and transfer the feature film to one or more addition devices, such as external devices 54, 56, 58 and 60. In addition, a user that wishes to download a movie or song, may select, in a single transaction, to obtain digital rights to that movie or song for multiple devices of the user.

In a mode of operation, the media content 52 is received by set-top box 10 with associated digital rights. Such digital rights can include a copy protection signal in accordance with a MACROVISION copy protection methodology, copy generation management system analogue (CGMS-A) copy protection signal, RIPGUARD, copy protection methodology, SAFECAST copy protection methodology CACTUS DATA SHIELD copy protection methodology or other copy protection methodology, digital watermark or other digital rights management signal or scheme that restricts the copying and or rebroadcast of the media content 52. In an alternative embodiment of the present invention, the digital rights can provide an indication to set-top box of the particular digital rights associated with the media content 52 and set-top box 52 adds the appropriate copy protection signal or other digital rights methodology in association with the transfer of the media content to display device 62 and/or to each external device 54, 56, 58 and 60, in accordance with the method of transfer, the type of media content, the format of the media content 52 during transfer, the type of external device and/or the specific rights obtained for that particular device. In addition, the digital rights can include digital watermarks, meta-tags, or other digital identifiers that that encode information such as the source of the media content 52, the fact the media content 52 is protected, identifiers for the subscriber and/or the devices associated with the subscriber that have rights to the media content, etc.

For example, if digital rights are obtained that allow set-top box 10 to play a particular video and to create a separate DVD, the transfer of the video content to display device 62 as an NTSC video signal can include Macrovision protection, and the DVD can be created by a DVD burner of set-top box 10 with Content Scrambling System (CSS) protection. In this fashion, a user may obtain digital rights to use the media content 52 for those devices that the user wishes to use to play the media content, and copy protection or other digital rights management can be implemented by the set-top box 10, and/or the external devices to allowing copying in accordance with the rights obtained, while restricting or otherwise prohibiting rebroadcast, copying and or further transmission of the media content in a manner that conflicts with the digital rights obtained.

In an embodiment of the present invention, the user can obtain digital rights via set-top box 10 or any of the external devices 54, 56, 58 60, etc., granted by the cable network on behalf of itself or on behalf of the copyright holders of the media content 52, that can include provisional rights or actual device specific rights for the external devices that the user has selected allowing playback of the media content by these particular external devices and prohibiting playback of the media content by other devices. For example, if the user elects to obtain digital rights to transfer the media content to a DVD and to an iPod, set-top box 10 could transfer the media content only to these particular devices and to apply the copy protection or other copy restriction mechanisms that are appropriate for the playback of the media content 52 using the DVD and the iPod.

As an alternative, the user can obtain digital rights, granted by the cable network on behalf of itself or on behalf of the copyright holders of the media content 52, that include provisional or actual device general rights for the transfer of the media content to N external devices, where N=1, 2, 3 based on a user selection. In this mode of operation, the set-top box, for each instance of media content 52 stored therein, maintains a register or other data structure that stores the number of remaining transfers allowed. For example, if the user elects to obtain digital rights to transfer the media content 52 to two external devices, the set-top box could allow, in response to a user request via a graphical user interface or other user interface, a transfer of the media content to a laptop computer with appropriate copy protection and to inform the user that only one additional transfer remained. At a later time, the set-top box could allow, in response to a user request, a transfer of the media content 52 to a cellular telephone with appropriate copy protection and inform the user that the allowable number of transfers has been exhausted.

It should be noted, that as in home gateway device 55, the media content 52 can be transferred to an external device from the network, from the subscriber's set-top-box 10 or from another subscriber's set-top box or device on a peer-to-peer basis, either directly or through a local area network and/or one or more other networks. As discussed earlier, the requests for rights can come as a group, can include provisional rights that are billed as used, or can come incrementally with billing for these rights commensurate with the rights obtained.

Figure 3:
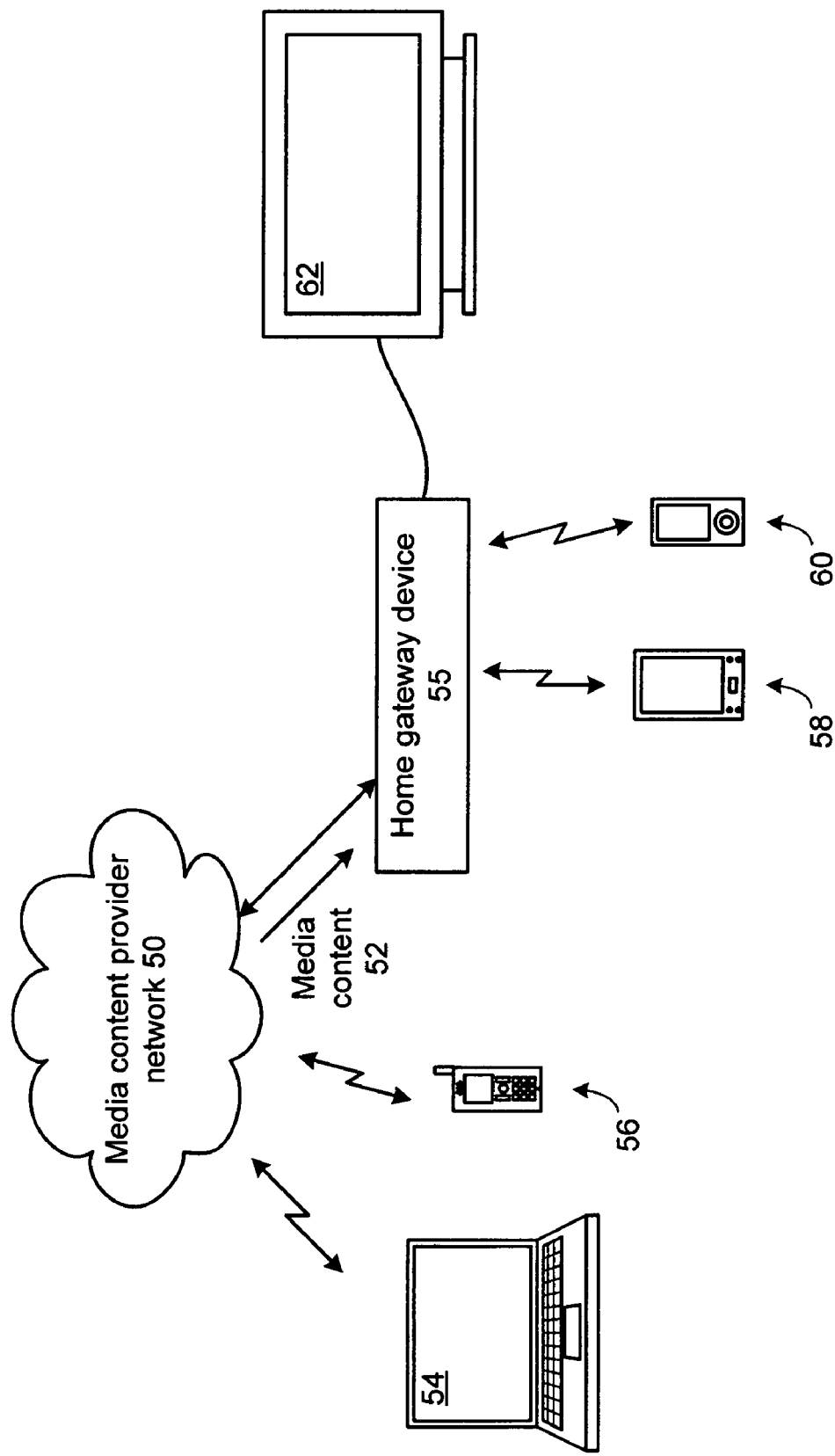
FIG. 3 presents a block diagram representation of a further media distribution system that includes a home gateway device 55 in accordance with an embodiment of the present invention.

FIG. 3 presents a block diagram representation of a further media distribution system that includes a home gateway device 55 in accordance with an embodiment of the present invention. In particular, a home gateway device 55 is shown that operates in accordance with the system described in FIG. 1 and optionally incorporates one or more of the functions and features ascribed to set-top box 10 described in conjunction with FIG. 2. In addition, home gateway device 55, through use of a graphical user interface or other user interface, can obtain digital rights for media content 52 that allow this media content to be directly downloaded to one or more external devices, for example. portable computer 54 and wireless telephone 56 as shown.

In particular, the home gateway device 55 receives a user request for media content 52 in addition to a user selection of one or more external devices to receive the media content 52. The media content 52 can be transferred to each of the selected devices in a format that corresponds to the particular devices selected. For example, a user can select to download the movie "Casablanca" as a compressed digital video file to portable computer 54 in a high resolution format and to wireless telephone 56 in a lower resolution format corresponding, for instance, to the smaller screen and/or lower screen resolution of this device.

It should be noted that, in this embodiment of the present invention, portable computer 54 and wireless telephone 56 each communicate directly with media content provider network 50 though a wired data network connection or wireless data network connection via the Internet or other public or private network. Once the digital rights necessary for downloading the media content 52 has been obtained for these devices via the home gateway device 55, and authentication of these devices by media content provider 50 via device identifiers and/or user passwords, etc. has occurred, download of the media content 52 can be initiated. As previously discussed, the media content provider may elect to insert an ad into the media content 52. In an embodiment of the present invention, one or more ads can be inserted by the media content provider in the media content provider network 50 for media content 52 obtained directly from the media content provider network. This ad may be a general ad, or an ad that is targeted based on the particular media content, targeted based on the location of particular device, the type of device or based on other information of the subscriber.

In addition, these ads can be inserted at the home gateway device 55 as directed by the media content provider network 50. For instance, the home gateway device 55 can include a database of meta-tags that would contain information associated with particular content and user profiles. These meta-tags can be inserted into the data files containing the multimedia content and used for inserting ads such as during a transcoding of the media content for the external device or other encoding, transcoding, transrating or transcaling of the media content 52 that occurs prior to transfer to the external device. The ads can be stored locally or obtained from an ad server managed by a third party, such as an ad service provider or other service provider. Obtaining ads from an ad service provider allows the ad service provider to select the particular ads and optionally to auction ad space and/or to make ad selections on a near-real time or real-time basis.

As discussed in conjunction with FIGS. 1 and 2, the media content 52 transferred to external devices 54 and 56 can include the appropriate copy protection in accordance with the digital rights obtained and in accordance with the format of the media content 52 as transferred to these devices.

Figure 4:
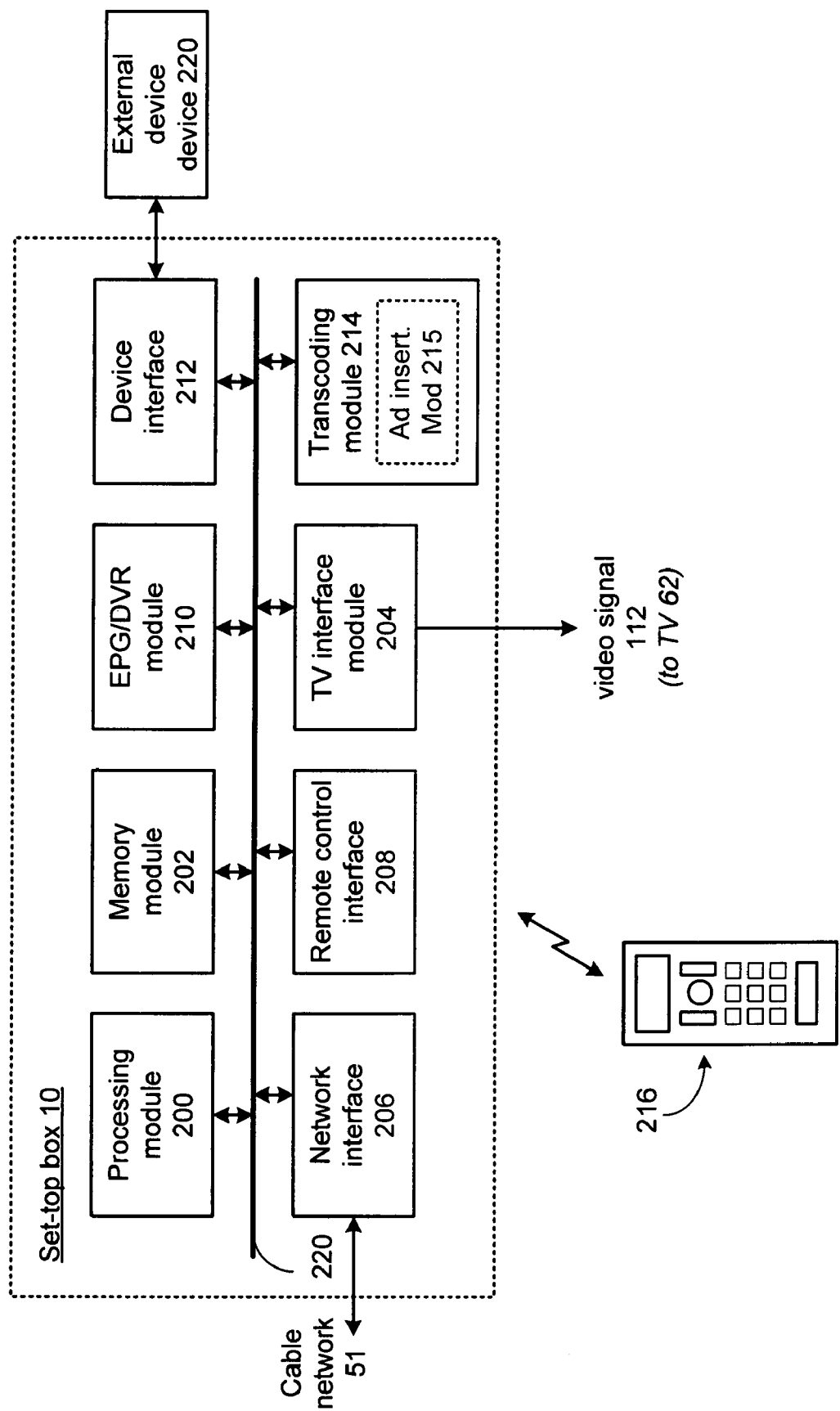
FIG. 4 presents a block diagram representation of a set-top box 10 in accordance with an embodiment of the present invention.

FIG. 4 presents a block diagram representation of a set-top box 10 in accordance with an embodiment of the present invention. In particular, set-top box 10 includes a device interface 212 for coupling to at least one external device 220, such as external devices 54, 56, 58, 60 or other external devices, a network interface 206 for coupling to cable network 51 to receive broadcast audio and video signals, to exchange control signaling and to optionally provide Internet access, a television interface module 204 for coupling to a television including a television monitor, a remote control interface 208 that receives user initiated signaling from a remote control device 216, a processor 200 that operates in accordance with a Open Cable Application Platform, Digital Video Broadcast-Multimedia Home Platform or other operating system layer or middleware, that runs an application that allows a user to obtain digital rights for one or more external devices in accordance with the present invention. In addition, set-top box 10 include a data bus 220, memory module 202, electronic program guide (EPG)/digital video recorder (DVR) module 210, and transcoding module 214.

In a mode of operation, the user, via prompts generated by the application and displayed on display device 62 via video signals 112, and selections received via remote control device 216 and remote control interface 208, can select media content 52 and can obtain digital rights for the media content to be played on one or more external devices. Set-top box 10 receives a video signal 110 and produces a processed video signal 112 for display on video display device 62 as either the playback of a compressed digital video file or a buffered live (realtime or near realtime) video signal that is produced in a format that corresponds to the format of video display device 62.

Video signal 110 can include an analog video signal that is formatted in any of a number of video formats including National Television Systems Committee (NTSC), Phase Alternating Line (PAL) or Sequentiel Couleur Avec Memoire (SECAM). Further, video signal 110 can be in a digital format such as a Motion Picture Experts Group (MPEG) format (such as MPEG1, MPEG2 or MPEG4), QuickTime format, Real Media format, Windows Media Video (WMV) or Audio Video Interleave (AVI), or another digital video format, either standard or proprietary. Set-top box 10 can either receive the video signal 110 with copy protection that is preserved in the production of processed video signal 112 or can otherwise produce copy protection signaling or other copy protection in the production of processed video signal 112.

Processing module 200 can be implemented using a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory, such as memory module 202. Memory module 202 may be a single memory device or a plurality of memory devices. Such a memory device can include a hard disk drive or other disk drive, read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry.

The other modules of set-top box 10 can be implemented in software, firmware or hardware, depending on the particular implementation of processing module 200. It should also be noted that the software implementations of the present invention can be stored on a tangible storage medium such as a magnetic or optical disk, read-only memory or random access memory and also be produced as an article of manufacture.

Memory module 202 can store the application, user selections, preferences and other data, the operating system, other software and firmware, and additionally, can store a plurality of compressed video files corresponding to instances of media content 52. As discussed above, memory module can include a plurality of different memory devices. In an embodiment of the present invention, the plurality of compressed video files are stored in a large capacity storage medium such as a hard disk drive or flash memory, however other memory devices may likewise be used, and in particular, a removable memory device can be used to store the compressed video files in instances where the media content 52 is transferred to one or more external devices via such a removable memory.

In operation, transcoding module 214 can encode the media content 52 received from video signal 110 or other input signal from cable network 51 into a digital file format or digital stream format for storage in memory module 202 and/or the particular digital video format use by one or more of the external devices 54, 56, 58, and 60 that have been selected by the user and in accordance with the digital rights have been obtained from the cable network 51 for these particular external devices. This encoding can include encrypting, transcoding, transcrypting, transrating, transcaling and other conversion from a one media format to one or more additional media formats. As previously discussed, these additional media formats can include respective copy protection or other digital rights mechanisms to allow the media content 52 to be transferred to or used only as allowed by the digital rights that have been obtained and not in other ways. Depending on the type of copy protection and the particular media formats, the copy protection can be removed for encoding or transcoding and reapplied in the newly encoded or transcoded format. Further, while one mode of copy protection can be present in a particular media format as received from cable network 51, another mode of copy protection can be applied to match the media format of the encoded or transcoded signal, stream or file. In addition, transcoding module 214 optionally includes an ad insertion module 215 that operates to insert ads, that are either stored locally in memory module 202 or retrieved from an ad service provider via cable network 51 or from the media content provider or other source as described in conjunction with FIGS. 1-3.

While the transcoding is described above as being included in transcoding module 214 that is part of set-top box 10, alternatively, these features can be included in a network server included as part of cable network 51. In particular, when a subscriber records video content onto set-top box 10, the information of that event could be sent to a network server which would reside within the head-end network of cable network 51. The network server would, in turn, transcode and transcrypt the content for the subscriber's other devices, either automatically or only when requested by the subscriber. In the case of automatic transcoding and transcription of content, the network server would include a learning algorithm where it would transcode and transcrypt content based only on information derived from the subscriber's past behavior.

For example, if a subscriber typically recorded weekly television episodes of Sitcom A and Drama B but historically only requested that Drama B be made available to his portable media player, then the Network Server, based on this subscriber's viewing habits, would automatically transcode, transcrypt and store on the network server, episodes of Drama B as they were recorded on his DVR. Conversely, if the user were to request Sitcom A for transfer onto his portable media player, the network server would then transcode and transcrypt the content in real-time since this request would seem to be a unique occurrence. Based on certain criteria (either set by the user or the service provider), the network server would continue to monitor the user's content consumption behavior and adapt accordingly. For example, if the subscriber would then begin to request Sitcom A for transfer to his portable media player on a weekly basis, upon the second occurrence the Network Server could begin to transcode and transcrypt the content automatically. It would then revert back to on-demand transcoding/transcryption if the user stopped requesting Sitcom A for transfer to his portable media player for two consecutive weeks, for example. This adaptive learning algorithm for content transcoding and transcryption would save valuable CPU resources and storage capacity at the network server.

EPG/DVR module 210 includes an electronic program guide that allows a user, through operation of user interface module 212 and one or more user interface devices 214 to obtain information regarding current or upcoming programs that can be viewed, downloaded or recorded. In an embodiment of the present invention, EPG/DVR module 210 includes digital video recorder functionality that operates in conjunction with memory module 202 to record, store, select, and playback media content 52. In operation of EPG 210, a user can establish playback and record settings and preferences, interactively choose programs to record, select stored programs for playback, to pause, fast forward and rewind playback of compressed video files and buffered live video streams used to generate the processed video signal 112.

In an embodiment of the present invention, display device 62 includes a display, such as a separate liquid crystal, plasma or other display device capable of displaying text and/or graphics. The application, the electronic program guide and the digital video recorder can generate overlay text, and graphics such as one or more menus to implement a menu driven graphical user interface that is presented on processed video signal 112 for display on display device 62. Through operation of the remote control device 216 or other pointing, indication or other user interface device, the user can select different choices or preferences, browse and select from a plurality of menus and/or otherwise interact with the application and the electronic program guide and digital video recorder in order to control the operation of the set-top box 10.

While TV interface module 204 has been described in terms of being coupled to a single display device 62, TV interface module 204 can likewise include multiple interfaces for coupling to two or more video display devices, with potentially different formats and through potentially different interfaces such as component video, S-video HDMI, RF video jack or other video interface connection. Device interface 212 can include a removable memory device such as a memory card, writeable disk drive, and/or a wireless or wired communication link such as a wireless local area network interface, a wireless personal area network interface, an Ethernet port, a parallel port, a serial port, a small computer systems interface port, a IEEE 1394 compliant interface, and a universal serial bus interface or other connection.

While a particular architecture is described above, other architectures including alternative bus architectures, and architectures where the functionality of bus 220 is replaced by one or more direct connections or links, can likewise be implemented.

FIG. 5 presents a pictorial representation of a screen display 230 in accordance with an embodiment of the present invention. In particular a screen display is presented as part of a user interface generated by set-top box 10 for display on display device 62 or other display device. This interactive screen can be navigated and selections can be made by the user through the use of the remote control device 216. In particular a device set-up menu is presented that allows a user to identify the particular devices or devices that could be coupled to the set-top box 10 for play, playback or downloading of media content, such as media content 52, either via set-top box 10 or directly from media content provider network 50, such a cable network 51.

In this case, the user has selected a color monitor and IPOD personal media player as two devices associated with set-top box 10. The user is in the process of selecting his or her third device from the list, in this case, a SONY PLAY STATION PORTABLE personal media player. As shown, the user is allowed to choose the particular devices associated with the set-top box 10 from a list of possible devices. In addition, in other screens, the user can identify additional parameters of these devices including analog video format, digital video format parameters such as screen resolutions, compression depth and other format (such as a Motion Picture Experts Group (MPEG) format (such as MPEG1, MPEG2 or MPEG4), QuickTime format, Real Media format, Windows Media Video (WMV) or Audio Video Interleave (AVI), h.264 or another digital video format, either standard or proprietary), a particular port or link that will be used to couple each device to the set-top box 10, and/or other settings for each corresponding device.

The information discussed above pertaining to the associated devices can be stored in a device file in memory 202 as well as being sent to media content network 50, such as cable network 51, to register the particular devices associated with the set-top-box 10 and/or with the particular subscriber. In addition, the user can be given the option of pre-authorizing rights for each of these devices. As shown in this example, the user has elected to pre-authorize rights for the color monitor but not the IPOD personal media player and the , and SONY PLAY STATION PORTABLE personal media player and this information can further be stored in the device file in memory. In this fashion, when media content 52 is selected by the user, rights can be automatically be obtained for each of the pre-authorized devices and additional costs that may be associated with obtaining rights for these devices can further be pre-authorized to be billed to the user. In this fashion, the user need not be queried for each selection of media content for a selection of the pre-authorized devices.

FIG. 6 presents a pictorial representation of a screen display 240 in accordance with an embodiment of the present invention. In particular a screen display is presented as part of a user interface generated by set-top box 10 for display on display device 62 or other display device. This interactive screen can be navigated and selections can be made by the user through the use of the remote control device 216. In this screen, the user can select from a list of media content 52, including video programming such as movies, instructional video, songs and music compilations, etc. In the example shown the user has opted to selected to receive the movie "Citizen Kane". In an embodiment of the present invention, additional screens can optionally be presented to select whether the movie will be transmitted as a video signal or downloaded as a video file.

FIG. 7 presents a pictorial representation of a screen display 250 in accordance with an embodiment of the present invention. In particular a screen display is presented as part of a user interface generated by set-top box 10 for display on display device 62 or other display device. This interactive screen can be navigated and selections can be made by the user through the use of the remote control device 216. In this screen the user is given the option to obtain rights to transfer the selected movie to additional devices. In the example shown, the user is selecting "Yes".

FIG. 8 presents a pictorial representation of a screen display 260 in accordance with an embodiment of the present invention. In particular a screen display is presented as part of a user interface generated by set-top box 10 for display on display device 62 or other display device. This interactive screen can be navigated and selections can be made by the user through the use of the remote control device 216. In this screen, the user is given the option of selecting a total number of devices for the movie Citizen Kane to be transferred. As shown, the user is charged an additional cost that is based on the number of additional devices selected. As previously discussed, this mode of operation allows the user to select the number of devices generally without specifying the specific devices.

FIG. 9 presents a pictorial representation of a screen display 270 in accordance with an embodiment of the present invention. In particular a screen display is presented as part of a user interface generated by set-top box 10 for display on display device 62 or other display device. This interactive screen can be navigated and selections can be made by the user through the use of the remote control device 216. In this screen, in an alternative mode from the mode described in FIG. 8, the user is allowed to select from a list of additional devices associated with set-top box 10 (retrieved from the device file stored in memory 202) and given the additional costs associated with obtaining digital rights for each of these devices. In this case the user has opted, for a fee of $1.19 in addition to the base fee of $4.99, to be able to download Citizen Kane to his or her iPod in addition to playing the movie on display device 62. As shown in this example, the fee varies based on the particular device or devices selected.

It should be noted that the screen displays shown in FIGS. 5-9 illustrate some of the many optional features of the present invention. Further options include obtaining digital rights and alternative fees for storing the media content 52 in the set-top box for playback multiple times, digital rights for the set-top box or external devices to restrict the playback of the media content 52 X total times or Y times per each device, and further options, etc.

Figure 10:
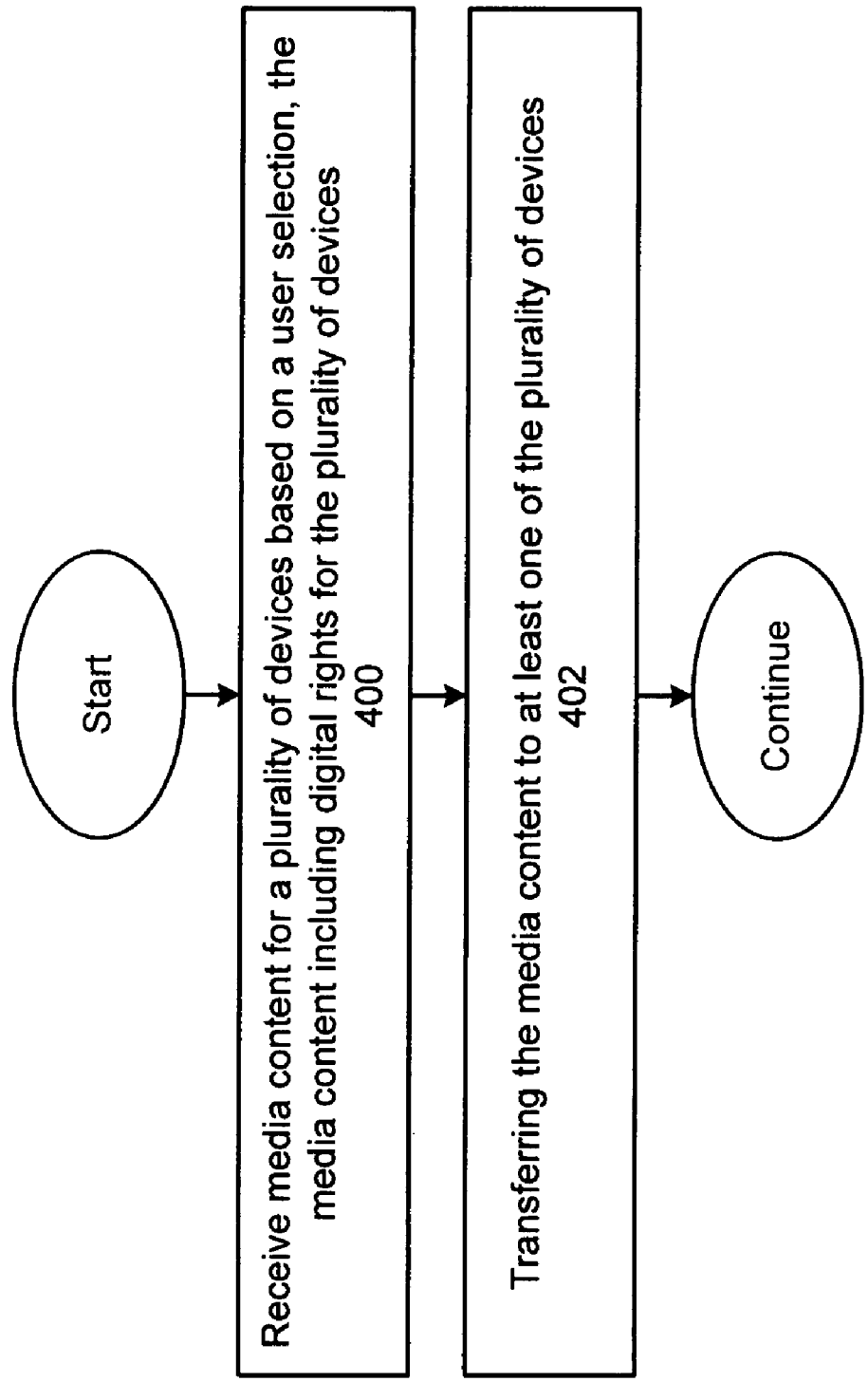
FIG. 10 presents a flowchart representation of a method in accordance with an embodiment of the present invention.

FIG. 10 presents a flowchart representation of a method in accordance with an embodiment of the present invention. In particular, a method is presented for use in conjunction with one or more of the features and functions described in association with FIGS. 1-9. In step 400, media content is received for a plurality of devices based on a user selection, the media content including digital rights for the plurality of devices. In step 402, the media content is transferred to at least one of the plurality of devices.

In an embodiment of the present invention, the step 400 includes receiving the media content at a set-top box and is implemented as an application running on an open cable application platform. The plurality of devices can include a set-top box, a television, a desktop computer, a portable computer, a personal digital assistant, a personal audio/video player, and a wireless telephone. The media content can be formatted in a first digital video format and step 402 can include transcoding the media content into a second digital video format for use by the at least one of the plurality of selected devices. This transcoding can include generating the second digital video file in accordance with the digital rights for the at least one of the plurality of selected devices.

In an embodiment of the present invention, user selection can be retrieved from a file containing information regarding the plurality of devices, and particularly, obtaining digital rights for at least one of the devices can incur an increased fee, and wherein the file can be created based a pre-authorization from the user to create the file and to incur the increased fee. The digital rights can include a corresponding plurality of device specific digital rights for each of the plurality of selected devices, each of the corresponding plurality of device specific digital rights allowing playback of the media content by one of the plurality of selected devices corresponding thereto and prohibiting playback of the media content by other devices.

Figure 11:
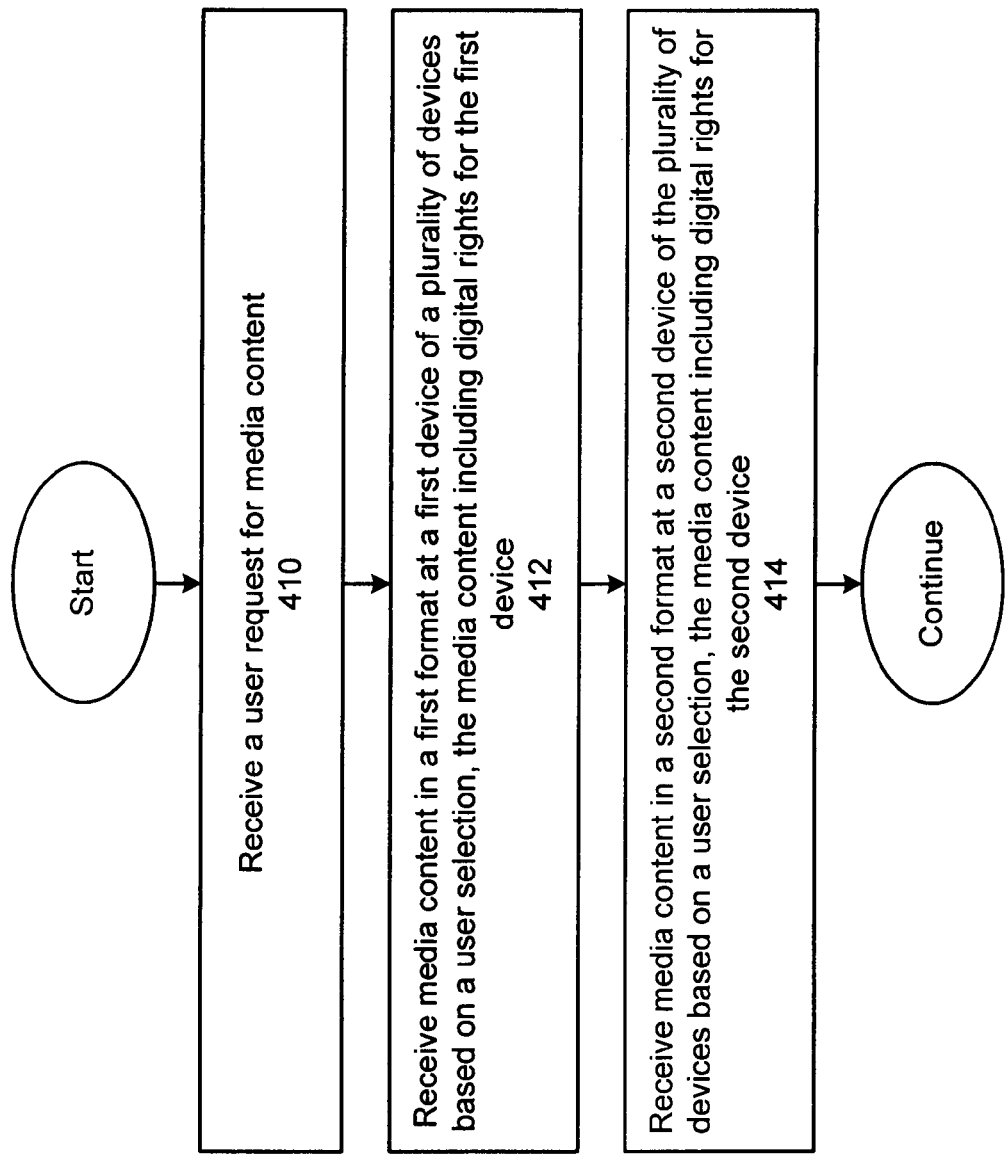
FIG. 11 presents a flowchart representation of a method in accordance with an embodiment of the present invention.

FIG. 11 presents a flowchart representation of a method in accordance with an embodiment of the present invention. In particular, a method is presented for use in conjunction with one or more of the features and functions described in association with FIGS. 1-9 and a potential alternative to the method of FIG. 10. In step 410, a user request is received for media content. In step 412, the media content is received in a first format at a first device of a plurality of devices based on a user selection, the media content including digital rights for the first device. In step 414, the media content is received in a second format at a second device of the plurality of devices based on the user selection, the media content including digital rights for the second device.

In an embodiment of the present invention, step 412 includes receiving the media content at a set-top box, as implemented as an application running on an open cable application platform. The plurality of devices can include a set-top box, a television, a desktop computer, a portable computer, a personal digital assistant, a personal audio/video player, and a wireless telephone. The user selection can be retrieved from a file containing information regarding the plurality of devices. Obtaining digital rights for the second device can incur an increased fee, and the file can be created based on a pre-authorization from the user to create the file and to incur the increased fee.

In addition, step 410 can come from the first device and an additional user request can be received for the media content from the second device. Step 412 can include receiving the media content from a media content provider network and step 414 can include receiving the media content from the first device, with or without prior transcoding or receiving the media content from the media content provider network.

FIG. 12 presents a flowchart representation of a method in accordance with an embodiment of the present invention. In particular, a method is presented for use in conjunction with one or more of the features and functions described in association with FIGS. 10 and 11. In step 420, a user is prompted with a plurality of options to download media content for the plurality of devices. In step 422, a selection is received from the user that corresponds to at least one of the plurality of options.

In an embodiment of the present invention, the plurality of options can include obtaining digital rights for the at least one external device at an increased fee, a cost for downloading the media content that is based on a total number of the plurality of devices, a cost for downloading the media content that is based on the plurality of devices, and can list particular devices that correspond to a user retrieved from a file containing information regarding the particular devices.

In preferred embodiments, the various circuit components are implemented using 0.35 micron or smaller CMOS technology. Provided however that other circuit technologies, both integrated or non-integrated, may be used within the broad scope of the present invention.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "coupled". As one of ordinary skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As the term module is used in the description of the various embodiments of the present invention, a module includes a functional block that is implemented in hardware, software, and/or firmware that performs one or module functions such as the processing of an input signal to produce an output signal. As used herein, a module may contain submodules that themselves are modules.

Thus, there has been described herein an apparatus and method, as well as several embodiments including a preferred embodiment, for implementing a home gateway device, set-top box and/or other device for obtaining digital rights to receive, store, transcode, transmit and/or transfer media content. Various embodiments of the present invention herein-described have features that distinguish the present invention from the prior art.

It will be apparent to those skilled in the art that the disclosed invention may be modified in numerous ways and may assume many embodiments other than the preferred forms specifically set out and described above. Accordingly, it is intended by the appended claims to cover all modifications of the invention which fall within the true spirit and scope of the invention.

What is claimed is:

1. A set-top box comprising:
   a device interface for coupling to at least one external device;
   a network interface for coupling to a cable network;
   a television interface for coupling to a television;
   a remote control interface for receiving user initiated signaling via a remote control device;
   a processor, coupled to the television interface, the device interface, the remote control interface and the network interface that operates in accordance with a open cable application platform operating system layer that runs an application that includes the following steps:
      receiving user selection of media content via the remote control interface;
      receiving user selection of the at least one external device via the remote control interface, wherein the at least one external device is capable of storing and playing the media content independently from the set-top box;
      sending a request for the media content via the network interface to the cable network for a plurality of selected devices including the set top box and the at least one external device, the request identifying the plurality of selected devices;

receiving the media content from the cable network via the network interface for playback via the television and the at least one external device, the media content including device specific digital rights for the set-top box and the at least one external device wherein the device specific digital rights allow playback by the plurality of selected devices and prohibit playback by other devices; and transferring the media content to at least one external device via the device interface.

2. The set-top box of claim 1 wherein the at least one external device includes at least one of: a desktop computer, a portable computer, a personal digital assistant, a personal audio/video player, and a wireless telephone.

3. The set-top box of claim 1 wherein the device interface includes at least one of, a wireless local area network interface, a wireless personal area network interface, an Ethernet port, a parallel port, a serial port, a small computer systems interface port, a IEEE 1394 compliant interface, and a universal serial bus interface.

4. The set-top box of claim 1 wherein the media content is formatted in a first digital video format and the set-top box further includes:

a transcoding module, coupled to the device interface and the processor, that transcodes the media content into a second digital video format for use by the at least external device.

5. The set-top box of claim 4 wherein the transcoding module generates the second digital video format in accordance with the digital rights for the at least one external device.

6. The set-top box of claim 4 wherein the transcoding module includes an ad insertion module for inserting an ad in the second digital video format.

7. The set-top box of claim 1 application is further operable to:

generate a display on the television that prompts a user with a plurality of options to select the at least one external device; and wherein receiving user selection of the at least one external device includes receiving a response from the user that selects the at least one external device in response to the prompts.

8. The set-top box of claim 7 wherein the plurality of options includes obtaining digital rights for the at least one external device at an increased fee.

9. The set-top box of claim 7 wherein the plurality of options includes a cost for receiving the media content that is based on a total number of the at least one external device.

10. The set-top box of claim 7 wherein the plurality of options includes a cost for receiving the media content that is based on the at least one external device.

11. The set-top box of claim 7 wherein the plurality of options lists particular devices, that correspond to a user retrieved from a file containing information regarding the particular devices, the particular devices including the at least one external device.

12. The set-top box of claim 1 further comprising:

a memory, coupled to the processor, that stores a file containing the user selection that includes information regarding the at least one external device.

13. The set-top box of claim 12 wherein the obtaining digital rights for the at least one external device is at an increased fee, and wherein the file is created based on the user selection and a pre-authorization from the user to create the file and to incur the increased fee.

14. A method for use in a set-top box that includes a remote control interface, an external device interface and a network interface, the method comprising:

receiving user selection of media content via the remote control interface;

receiving user selection of at least one external device via the remote control interface, wherein the at least one external device is capable of storing and playing the media content independently from the set-top box;

sending a request for the media content via the network interface to the cable network for a plurality of selected devices including the set top box and the at least one external device, the request identifying the plurality of selected devices;

receiving the media content via the network interface for the plurality of selected devices, the media content including digital rights for the plurality of selected devices; and transferring the media content to at least one of the plurality of selected devices via the external device interface.

15. The method of claim 14 wherein the step of receiving the media content is implemented as an application running on an open cable application platform.

16. The method of claim 15 wherein the user selection is retrieved from a file containing information regarding the plurality of devices selected.

17. The method of claim 16 wherein obtaining digital rights for at least one of the plurality of selected devices incurs an increased fee, and wherein the file is created based a pre-authorization from the user to create the file and to incur the increased fee.

18. The method of claim 14 wherein the plurality of devices include at least two of: a set-top box, a television, a desktop computer, a portable computer, a personal digital assistant, a personal audio/video player, and a wireless telephone.

19. The method of claim 14 wherein the media content is formatted in a first digital video format and the step of transferring the media content includes transcoding the media content into a second digital video format for use by the at least one of the plurality of selected devices.

20. The method of claim 19 wherein the transcoding includes generating the second digital video format in accordance with the digital rights for the at least one of the plurality of selected devices.

21. The method of claim 19 wherein the transcoding includes inserting an ad in the second digital video format.

22. The method of claim 19 wherein the transcoding is performed in a network server.

23. The method of claim 19 wherein the transcoding is performed automatically based on past behavior of a subscriber.

24. The method of claim 19 wherein the transcoding is performed in response to a subscriber request for the media content.

25. The method of claim 14 further comprising:

prompting a user with a plurality of options to download media content for the plurality of selected devices; and receiving a selection from the user that corresponds to at least one of the plurality of options.

26. The method of claim 25 wherein the plurality of options includes obtaining digital rights for the at least one external device at an increased fee.

27. The method of claim 25 wherein the plurality of options includes a cost for downloading the media content that is based on a total number of the plurality of selected devices.

28. The method of claim 25 wherein the plurality of options includes a cost for downloading the media content that is based on the plurality of selected devices.

29. The method of claim 25 wherein the plurality of options lists particular devices that correspond to a user retrieved from a file stored in a memory of the set-top box, the file containing information regarding the particular devices.

30. The method of claim 14 wherein the digital rights includes a corresponding plurality of device specific digital rights for each of the plurality of selected devices, each of the corresponding plurality of device specific digital rights allowing playback of the media content by one of the plurality of selected devices corresponding thereto and prohibiting playback of the media content by other devices.

31. A method for use with a plurality of devices each capable of independently storing and playing media content, the method comprising:

receiving user selection of media content via a first device of the plurality of devices:

receiving user selection of a second device of the plurality of devices, via the first device:

sending to a media content provider network via the first device, a request for the media content, the request identifying the plurality of selected devices;

receiving from the media content provider network, the media content in a first format at the first device, the media content including digital rights for the first device; and receiving from the media content provider network, the media content in a second format at the second device, the media content including digital rights for the second device.

32. The method of claim 31 further comprising the step of:

transcoding the media content;

wherein receiving the media content at the first device includes receiving the media content after transcoding.

33. The method of claim 32 wherein the transcoding includes inserting an ad.

34. The method of claim 32 wherein the transcoding is performed in a network server.

35. The method of claim 32 wherein the transcoding is performed automatically based on past behavior of a subscriber.

36. The method of claim 32 wherein the transcoding is performed in response to a the request for the media content.

37. The method of claim 31 wherein the step of receiving the media content in the first format includes receiving the media content at a set-top box.

38. The method of claim 37 wherein the step of receiving the user selection of the media content is implemented as an application running on an open cable application platform of the set-top box.

39. The method of claim 31 wherein the plurality of devices include at least two of: a set-top box, a television, a desktop computer, a portable computer, a personal digital assistant, a personal audio/video player, and a wireless telephone.

40. The method of claim 31 further comprising:

prompting a user with a plurality of options to download media content for the plurality of devices; and receiving a selection from the user that corresponds to at least one of the plurality of options.

41. The method of claim 40 wherein the plurality of options includes obtaining digital rights for at least one of the plurality of devices at an increased fee.

42. The method of claim 40 wherein the plurality of options includes a cost for receiving the media content that is based on a total number of the plurality of devices.

43. The method of claim 40 wherein the plurality of options includes a cost for receiving the media content that is based on the plurality of devices.

44. The method of claim 40 wherein the plurality of options lists particular devices that correspond to a user retrieved from a file containing information regarding the particular devices.

45. The method of claim 31 wherein the user selection is retrieved from a file stored in a memory of the first device containing information regarding the plurality of devices.

46. The method of claim 45 wherein obtaining digital rights for the second device incurs an increased fee, and wherein the file is created based on a pre-authorization from the user to create the file and to incur the increased fee.

* * * * *